United States Patent [19]

Amorese et al.

[11] 4,361,334

[45] Nov. 30, 1982

[54] COMPRESSION SEALED COMPOSITE SEAL SEAT WITH COOLING PASSAGES

[75] Inventors: Franklyn J. Amorese, Hilton; Vincent J. Piarulli, Rochester; James W. Chapman, Penfield, all of N.Y.

[73] Assignee: The Pfaudler Co. Inc., Rochester, N.Y.

[21] Appl. No.: 208,527

[22] Filed: Nov. 20, 1980

[51] Int. Cl.³ .................. F16J 15/16; F16J 15/34
[52] U.S. Cl. .................................... 277/16; 277/65; 277/96.2
[58] Field of Search ............... 277/16, 96 R, 96.2, 277/87, 65

[56] References Cited

U.S. PATENT DOCUMENTS

| 2,226,001 | 5/1938 | LaBour | 286/11 |
|---|---|---|---|
| 2,249,930 | 4/1939 | Bailey | 286/11 |
| 2,931,631 | 10/1954 | Harrison | 257/305 |
| 2,948,555 | 8/1955 | Wright | 286/11.13 |
| 3,015,506 | 3/1958 | Tracy | 286/11.14 |
| 3,147,982 | 9/1964 | Klein | 277/16 |
| 3,357,706 | 1/1965 | Wilkinson | 277/15 |
| 3,477,729 | 5/1967 | Hershey | 277/1 |
| 3,578,343 | 5/1971 | Taschenberg | 277/16 |
| 3,582,092 | 6/1971 | Amorese et al. | 277/87 |
| 3,770,181 | 12/1971 | Ståhl | 277/96 |
| 3,782,735 | 7/1971 | Novosad | 277/22 |
| 3,822,890 | 7/1974 | Bourgeois | 277/65 |
| 4,109,920 | 8/1978 | Wiese | 277/65 |
| 4,162,826 | 3/1978 | Van Der Beck et al. | 350/319 |
| 4,281,839 | 8/1981 | Schoenmeyr | 277/96.2 |

Primary Examiner—Robert I. Smith
Attorney, Agent, or Firm—Theodore B. Roessel; Roger Aceto

[57] ABSTRACT

A stationary seal seat for a package rotary mechanical seal is formed by compression sealing a ceramic ring within a glass coated metal ring. The ceramic provides the seat for a rotating seal member and the metal ring provides the surfaces which receive the loading forces when mounting the stationary seal seat. The glass coating on the metal functions to fuse the ceramic and metal rings together and provides a gas tight seal at the interface between the two rings. In addition, the ceramic ring has a peripheral groove defining a fluid passage for circulation of a coolant around the ceramic.

9 Claims, 2 Drawing Figures

COMPRESSION SEALED COMPOSITE SEAL SEAT WITH COOLING PASSAGES

BACKGROUND OF THE INVENTION

The present invention relates generally to a package rotary seal assembly and more particularly to such an assembly having an improved stationary seal seat which can be operated without lubrication at the seal face.

Rotary seals are well known in the art and the present invention represents an improvement in the type of rotating package seals generally disclosed in U.S. Pat. No. 3,582,092. In the type of package rotary seal illustrated in that patent, the stationary seal seat, historically, has been produced from either of two materials. One of these materials was a high density, hard ceramic, such as alumna, tungsten carbide, silicon carbide or the like. Such high density ceramics provide good corrosion resistance and a hard non-wearing surface which can be lapped to a smooth finish at the seal face. Such a material has its drawbacks, however, in that it is brittle and susceptible to breakage during mounting of the seal and care must be exercised when clamping the seal in place. Also non-metallic seats are relatively expensive in large sizes.

A second material employed as the stationary seat has been a glass or crystalized glass coated stainless steel. The glass coated stainless steel provides a less expensive seal seat in the larger sizes and a rugged seal which is not easily damaged during mounting. On the other hand, the glass or crystalized glass coating provides a seal surface which is inferior to the high density, hard ceramic.

In the present invention, the desirable features of both types of seals are combined to provide a stationary seal member which has a hard ceramic, non-wearing sealing surface combined with a glass or crystalized glass coated stainless steel mounting ring.

Another disadvantage of prior art package seals is that for most applications a lubricant must be applied at the seal faces. Otherwise there is excessive wear of the rotating seal member and often an undesirable build-up of heat. While systems are known for lubricating and cooling the rotating seal there are various applications where it is desirable to run the seal without a lubricant. For example, in pharmaceutical applications, there must be no leakage of a contaminant, such as a lubricant, into the pharmaceutical mixture being prepared. Accordingly, mechanical rotating seals for vessels used to produce pharmaceuticals are usually run dry to eliminate the likelihood of contamination by leakage of the lubricant into the process. However, because the seals are operated dry, rotational speeds must be kept to a minimum to minimize wear on the rotating element of the seal and to prevent excessive heat buildup at the seal face which could ignite vapors generated during production of the pharmaceutical.

The present invention, then, provides a stationary seat for a rotating mechanical seal which can be run dry at a reasonable speed with minimum wear and heat generation. Such a seal, while being useful for a wide variety of applications, finds primary utility in the manufacture of pharmaceuticals and food stuffs.

SUMMARY OF THE INVENTION

The present invention can be characterized in one aspect thereof by the provision of a stationary seat for a rotating mechanical seal. The seat includes an annular ceramic insert defining the bearing surface for the rotating seal member wherein the ceramic insert is disposed within a metal ring which surrounds and supports the insert. The metal ring is compression sealed about the insert and a glass coating at the interface between the ceramic insert and metal ring fuses the two together. The ceramic insert is also provided with an annular passage extending around the insert at the interface between the insert and the metal ring. Ports extending through the metal ring and communicating with the annular passage supply a circulating coolant through the passage.

DESCRIPTION OF THE PREFERRED EMBODIMENTS

Figure 1:
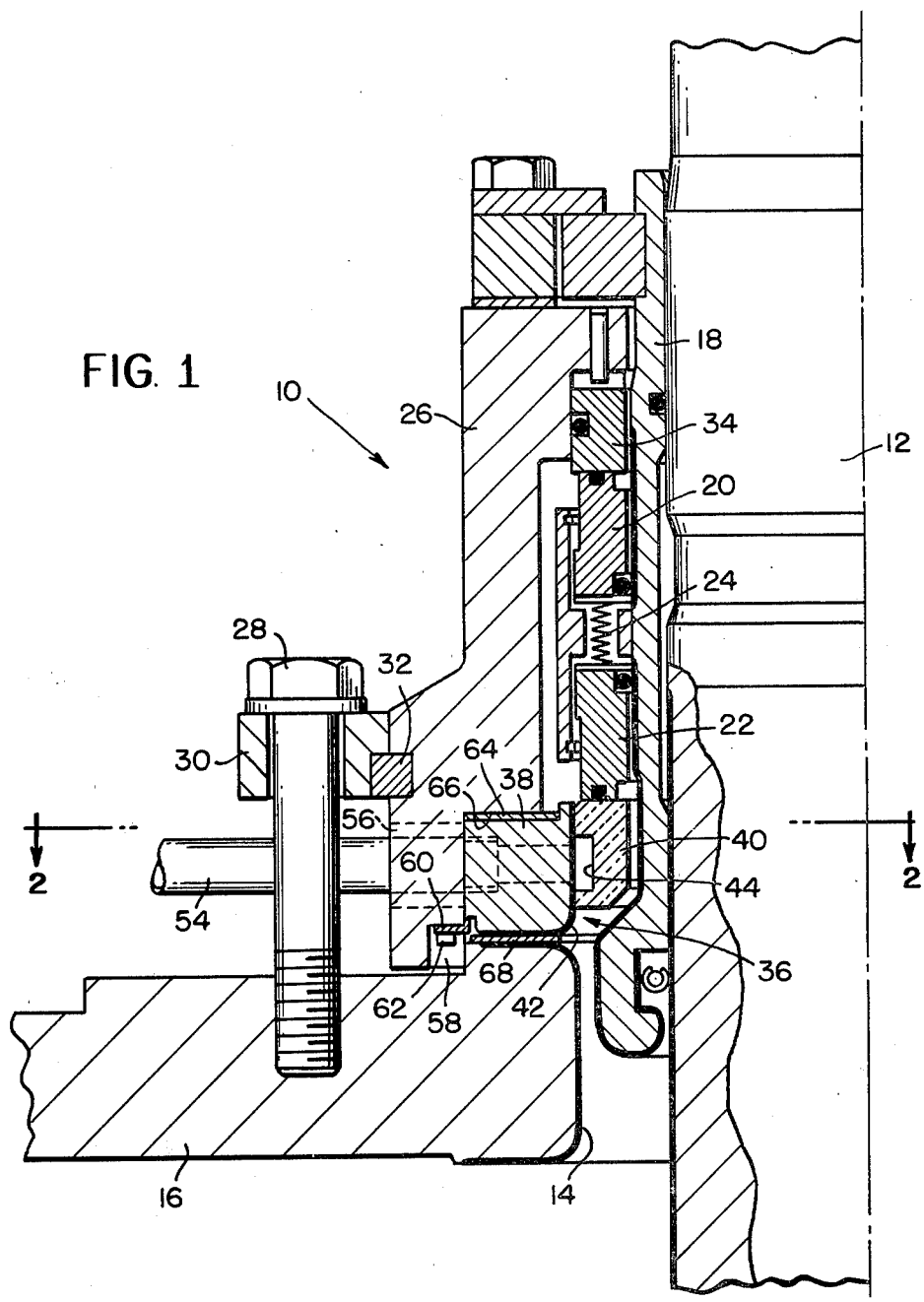
FIG. 1 is a side elevation view partly broken away and in section of the package rotary seal employing the stationary seal seat of the present invention.

Referring to the drawings, FIG. 1 shows the package rotary seal assembly employing the seat of the present invention generally indicated at 10. This assembly rotatably seals about a shaft 12 which extends through an opening 14 in a vessel wall 16.

For the most part, the components of the package seal assembly 10 are conventional, many of these components being described in greater detail in U.S. Pat. No. 3,582,092. Briefly, the conventional components include a sleeve 18 which is fixed for rotation with shaft 12. This rotating sleeve carries two rotating seal members, an upper outboard seal member 20 and a lower inboard seal member 22. These rotating seal members preferably are made of carbon or like material and are urged axially apart by an intermediate spring 24.

The stationary or fixed components of the package seal include an outer housing 26 which is attached to the vessel wall 16 by any suitable means such as bolts 28. While bolts 28 can be attached directly to the housing as shown in U.S. Pat. No. 3,582,092, it is preferred that the bolts attach the housing to the vessel wall 16 by means of a flange and split ring arrangement shown at 30, 32 respectively.

Carried by housing 26, adjacent its upper end is a stationary outboard seal seat 34. This outboard seal seat is not exposed to the environment within the vessel so it can be made of conventional materials.

Adjacent the lower end of housing 26 is the stationary inboard seal seat generally indicated at 36. It is this seal seat which is exposed to the environment within the vessel and which has a novel construction according to the present invention. The inboard seat 36 is a novel composite structure comprising an outer steel ring 38 and an inner ring or insert 40. This insert 40 is made of a high density ceramic such as alumna, tungsten carbide, silicon carbide or the like.

The inner ceramic ring is fused and compression sealed within the outer ring 38. In this respect, the outer ring carries adjacent its inner periphery and bottom face a continuous coating of glass or semi-crystaline glass 42. This glass coating performs two functions. First, it protects the steel ring 38 from corrosive attach by materials within the vessel and provides a easily cleaned contamination free surface in cases where the process being carried on within the vessel involves a pharmaceutical, food stuff or the like. Second, glass coating 42 functions to intimately bond the ceramic inner ring 40 to the steel ring. This bonding is accomplished by heating the pre-glassed metal ring to a sufficiently high temperature so that the ring expands and its inner diameter becomes larger than the outer diameter of insert 40.

The ring is removed from the heat and positioned so that a cold insert can be placed in the metal ring. The entire assembly is then reheated so that the glass coating 42 becomes fluid. During this heating period, the insert expands so that it positively contacts and seals to the fluid glass coating thereby assuring a strong gas tight seal between the mating surfaces.

The entire assembly is then cooled to insure a uniform stress distribution so that the ceramic insert is placed in a high degree of favorable compressive stress. The dimensions of the steel ring and the type and thickness of the glass coating, as well as the dimensions of the ceramic insert are choosen on a rational basis considering in-use requirements, sealing requirements and stress considerations in the ceramic insert, the steel ring and the glass coating. In any event, the end product is an assembly made by compression sealing a high density ceramic within a corrosion resistant glass coated steel ring, the intermediate glass bonding layer providing a strong, gas tight seal between the mating surfaces at the steel ring-ceramic insert interface.

The composite seal seat as described offers the advantage of having a hard, uniform, ceramic surface to provide the bearing surface for the rotating seal member 22, while employing only a minimum amount of ceramic necessary to produce the seal. This has the advantage of being less expensive than an all ceramic seal seat of a larger size. The assembly further offers a ruggedness of a glass-metal ring for mounting purposes so that fracture of the seal seat is less likely to occur when the assembly 36 is clamped into position as shown in FIG. 1. It should be appreciated that the thickness of metal ring 38 between its upper and bottom faces is greater than the corresponding thickness of ceramic ring 40. With this arrangement the ceramic ring does not engage the vessel wall so that all mounting forces are carried by the metal ring 38.

In order to facilitate installation of seal seat 36 about shaft 12, the seat is attached to and carried by housing 26. This is accomplished by mounting the seat within the open end 58 of the housing by any suitable means such as the retaining ring 60 and bolts 62 shown in FIG. 1. A flat gasket 64 is interposed between the upper face of metal ring 38 and an end face 66 of the housing to provide a seal therebetween. A second flat gasket 68 seals between the glassed bottom face of the metal ring and the vessel wall 16 about the vessel opening.

Figure 2:
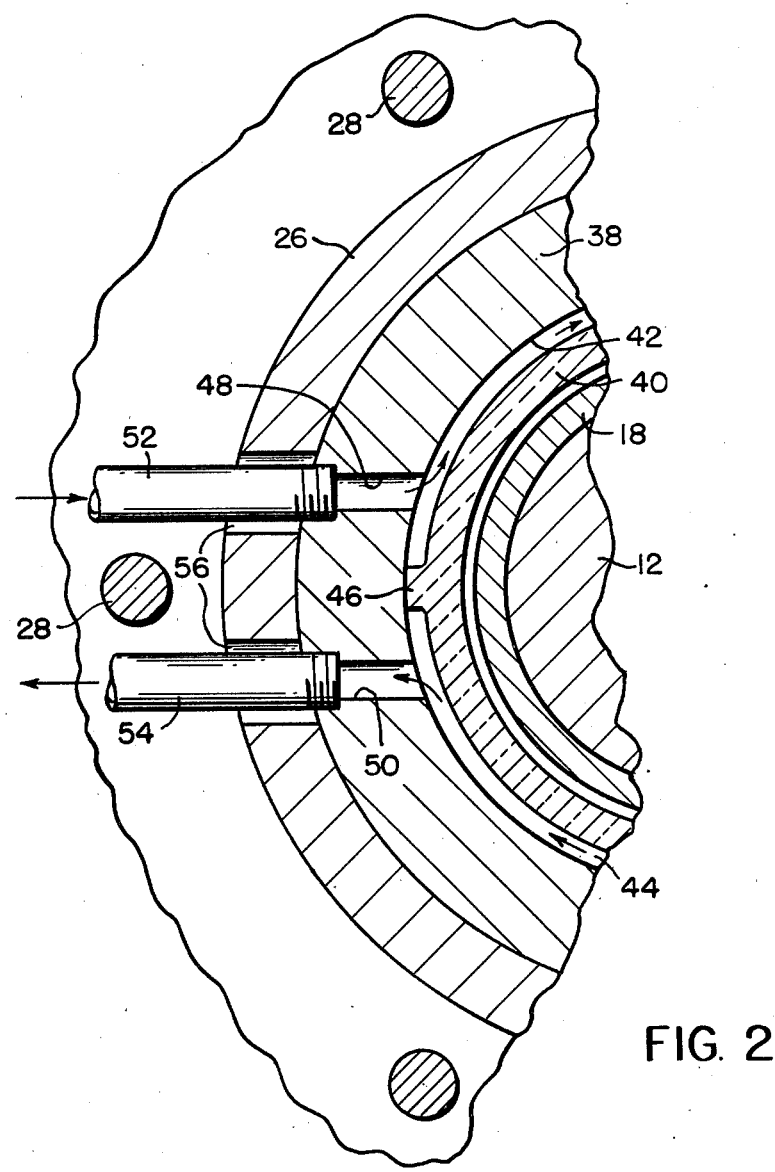
FIG. 2 is a view taken along lines 2—2 of FIG. 1.

As a further feature of the inboard seal seat 36, FIGS. 1 and 2 show that the ceramic insert 40 is provided with an annular passage 44 which extends around the insert at the interface between the insert 40 and the outer ring 38. This passage 44 does not extend completely around the periphery of the ceramic insert and instead a small wall 46 of the ceramic is left (FIG. 2) to form a dam for purposes set out hereinbelow.

Extending through metal ring 38 and communicating with passage 44 are two ports, an inlet port 48 and outlet port 50. As shown in FIG. 2, these ports communicate with annular passage 44 on either side of wall 46. With this arrangement, a cooling fluid such as water or a gas may be introduced into the passage 44 through the inlet port 48. The fluid, then, will circulate around the ceramic insert within the annular passage and exit through outlet port 50. Conduits 52, 54 which are threaded respectively to ports 48 and 50 extend through clearance openings 56 in the housing provide for circulating of fluid from some remote source to the annular passage 44.

It has been found that the circulation of such a cooling fluid greatly reduces the operating temperature of the seal even when the seal is run dry, thereby prolonging seal life and reducing the danger of ignition of volatile materials produced by the process being conducted within the vessel.

The following examples illustrates the increased life and lower operating temperature of the stationary seal of the present invention when operated dry as compared to a similar seal without the internal coolant.

A first field test was conducted on one version of the seal. This seal included the same basic components as the seal shown in the drawings, except the inboard seat was not designed to accept any cooling. After approximately 1500 hours of dry or unlubricated operation, inspection revealed that approximately 0.003 inches of wear has occurred on the rotating carbon seal member. During the field test it was also determined that the heat generated at the seal faces was a matter for concern.

Based on this field test, the seal assembly was redesigned in accordance with the present invention to provide a water cooled seat. In bench tests, performed in a room temperature environment of about 70° F. it was determined that the face temperature of the ceramic seal seat was maintained at about 100° F. using a water flow through the seat of about ⅛ gallon per minute. With no water flow, face temperatures of about 300° F. were generated.

The redesigned seal assembly was then field tested under operating conditions similar to the first field test described above. After about 2,000 hours of dry, unlubricated operation, wear on the rotating carbon seal member was measured at less than 0.0005 inches and at no time during operation was sufficient heat generated to warrant concern.

Thus, it should be appreciated that the present invention provides seal seat which can be operated unlubricated without excessive wear or heat generation at the seal faces. Also by placing the glass coated metal ring about the ceramic seal seat, a hard, wear resistant seal seat is provided which is less likely to be damaged during mounting than an all ceramic seat.

It is important to note that locating the cooling passage 44 within the ceramic ring 40, as opposed to locating it within the metal ring 38, allows the coolant to circulate as close to the rotating seal member as possible. Use of glass to seal between the ceramic and metal rings provides a more effective means to contain the coolant within its channel than an o-ring or like compliant seal.

Having described the invention in detail, what is claimed as new is:

1. A stationary seal seat for a rotating mechanical seal comprising:
    (a) a ceramic ring having a groove extending about its outer periphery and an end face which is finished to form a seal face;
    (b) a metal mounting ring surrounding and supporting said ceramic ring, said mounting ring being in compression sealed engagement about the periphery of said ceramic ring, the inner periphery of said metal ring extending over said groove to form a closed passage extending around said ceramic ring;

(c) a glass coating on the inner periphery of said metal mounting ring, said glass coating providing a gas tight seal at the metal ring-ceramic ring interface and acting to fuse said ceramic and metal rings together; and (d) said metal ring having a pair of ports extending inward from the outer periphery thereof and communicating with said passage, one of said ports being a fluid inlet and the second being a fluid outlet.

2. A stationary seal seat as in claim 1 wherein said ceramic ring has a portion extending into said groove and against the inner periphery of said metal ring intermedial said ports to dam said passage and insure circulation of fluid from said inlet port and around said ceramic ring to said outlet port.

3. A stationary seal seat as in claim 1 wherein said glass coating is continuous and extends from said inner periphery over a face of said metal ring.

4. A stationary seal seat as in claim 3 wherein said glass coating extends over only the lower face of said metal ring.

5. A stationary seal seat as in claim 1 wherein said ceramic ring is a high density alumina.

6. A stationary seal seat as in claim 1 or 5 wherein said metal ring is stainless steel.

7. A stationary seal seat as in claim 1 wherein said ports are provided with internal threads adjacent the outer periphery of said metal ring for attachment to fluid conduits.

8. A stationary seal sent as in claim 1 wherein the axial thickness of said ceramic ring is less than the axial thickness of said metal mounting ring.

9. In a package rotary seal for rotatably sealing about a shaft extending through an opening in a vessel wall, the package seal including an annular housing for attachment to the vessel about the opening, a sleeve for attachment to the shaft, inboard and outboard rotating seal members carried by the sleeve for rotatably sealing against stationary inboard and outboard seal seats carried by the housing, an improved inboard stationary seal seat comprising:

(a) a metal mounting ring fixed within one end of said housing, said ring having a pair of adjacent ports extending inwardly through said ring from its outer periphery to its inner periphery, said ports aligning with openings through said housing and being adapted to connect to fluid conduits extending through said housing openings;

(b) said metal ring having a face adapted to seal against the vessel wall about the vessel opening;

(c) a continuous glass coating extending over the inner periphery of said metal ring and said face;

(d) a ceramic ring supported within said metal ring, said ceramic having a groove extending about its outer periphery communicating with said ports and a face which is adapted to provide a seal face for said inboard rotating seal, the thickness of said ceramic ring from one end face to another being less than the corresponding thickness of said metal ring; and (e) said metal ring being compression sealed about said ceramic ring, said glass coating on said metal ring fusing said rings together and providing a gas tight seal at said metal ring-ceramic ring interface.

* * * * *